Patented Aug. 3, 1943

2,326,048

UNITED STATES PATENT OFFICE 2,326,048

PROCESS FOR PREPARING POLYVINYL ACETAL RESINS

James G. McNally, Charles R. Fordyce, and Ralph H. Talbot, Rochester, N. Y., assignors to Eastman Kodak Company, Rochester, N. Y., a corporation of New Jersey No Drawing. Application June 22, 1940, Serial No. 341,962

5 Claims. (Cl. 260—73)

This invention relates to a process for preparing resins and more particularly to a process for preparing polyvinyl acetal resins.

It is known that polyvinyl acetal resins can be prepared by deesterifying a polyvinyl ester and concomitantly condensing the deesterified product with one or more aldehydes. In these prior art processes, more or less handling of relatively highly thermoplastic polyvinyl esters is involved, with the result that the polyvinyl ester, and hence, the ployvinyl acetal resin prepared therefrom, is contaminated to a greater or lesser degree with impurities.

We have now found a process for preparing polyvinyl acetal resins which eliminates entirely the handling of the relatively highly thermoplastic polyvinyl esters. It is, accordingly, an object of our invention to provide an improved process for preparing polyvinyl acetal resins. Other objects will become apparent hereinafter.

In accordance with our invention, we polymerize not more than 90% by weight of a selected quantity of a vinyl ester, the polymerization being carried out in a solvent for the polyvinyl ester, and then form a polyvinyl acetal by incorporating in the resulting solution, a deesterification catalyst and a substance selected from the group consisting of alcohols and water. During the process, the polyvinyl ester is deesterified to give a polyvinyl compound containing hydroxyl groups which react with the acetaldehyde (formed by deesterification of the monomeric vinyl ester) to give a polyvinyl acetal resin.

In practicing our invention, we prefer to employ vinyl acetate, although other vinyl esters, such as vinyl propionate and vinyl butyrate, for example, can be employed. Any of the known polymerization catalysts can be employed to hasten the polymerization. Organic peroxides, such as benzoyl peroxide or acetyl peroxide, for example, are especially suitable. As solvents in which to effect the polymerization, aromatic hydrocarbons, such as benzene or toluene, lower aliphatic acids, such as acetic or propionic, or esters, are advantageously employed. As deesterification catalysts, acid deesterification catalysts, particularly mineral acids, such as hydrochloric acid or sulfuric acid, for example, are advantageously employed. As alcohols, methyl or ethyl alcohol are advantageously employed.

When incorporating the alcohol or water in the reaction mixture, we can, if desired, also incorporate an aldehyde or ketone, thereby forming a mixed polyvinyl acetal resin containing acetaldehyde acetal groups and acetal groups corresponding to the aldehyde or ketone employed. Aldehydes, such as formaldehyde, propionaldehyde, butyraldehyde, chloracetaldehyde, benzaldehyde or furfuraldehyde can be employed. Ketones, such as cyclohexanone, can be employed. Even acetaldehyde can be added to the reaction mixture, although this is usually not necessary.

Additional monomeric vinyl ester is advantageously incorporated in the reaction mixture.

The following examples will serve to illustrate the manner of practicing our invention. These examples, however, are not intended to limit our invention. The parts given in the examples are parts by weight.

Example 1

100 parts of vinyl acetate were dissolved in 100 parts of ethyl acetate containing 0.5 part of benzoyl peroxide. The mixture was heated on a steam bath, under reflux, for 6 hours. In this manner, there was obtained a viscous solution of polyvinyl acetate containing monomeric vinyl acetate. The viscous solution was cooled to 40° C. To the cooled solution were added 100 parts of ethyl alcohol containing 10 parts of concentrated sulfuric acid. 50 parts of vinyl acetate were also added to the solution. The resulting mixture was allowed to stand at 40° C. for 4 days. At the end of this time, the reaction mixture was poured into water to precipitate the resin. The precipitated resin was washed with water and ultimately allowed to dry in the air. The polyvinyl acetaldehyde acetal resin so obtained contained an acetate group content equivalent to 6% by weight of polyvinyl acetate.

Example 2

100 parts of vinyl acetate were dissolved in 70 parts of benzene containing 0.2 part of benxoyl peroxide. The resulting mixture was heated on the steam bath, under reflux, for 5 hours. To the resulting solution of polyvinyl acetate and vinyl acetate (cooled to 100° F.) were added 200 parts of glacial acetic acid and then 200 parts of 40% (by weight) of aqueous acetic acid, while stirring. With continued stirring, 40 parts of paraformaldehyde and 10 parts of concentrated sulfuric acid dissolved in 10 parts of water, were added to the resulting solution. The resulting mixture was held at 100° F. for 7 days. At the end of this time, the reaction mixture was poured into water to precipitate the polyvinyl formaldehyde-acetaldehyde acetal resin. The precipitated resin was washed with water and finally allowed to dry in the air.

Example 3

300 parts of vinyl acetate were dissolved in 198 parts of glacial acetic acid containing 8.1 parts of acetyl peroxide (equivalent to 5.6 parts of sodium perborate per 100 cc. of benzene). The resulting mixture was stirred and heated at 80° C., under reflux. A vigorous reaction took place, the temperature rising to 120° C. The reaction mixture was cooled and to it were added 300 parts of glacial acetic acid, 80 parts of paraldehyde, 54 parts of trioxymethylene and 280 parts of water containing 40 parts of concentrated sulfuric acid. The resulting mixture was heated to 60° C., under reflux, for 6½ hours. At the end of this time, the reaction mixture was cooled and diluted with an equal volume of glacial acetic acid. The diluted reaction mixture was poured into water to precipitate the polyvinyl formaldehyde-acetaldehyde acetal resin. The precipitated resin was washed with water and finally dried in the air.

Still further examples of our new process could be given but the foregoing are believed to demonstrate the manner of practicing our invention.

What we claim as our invention and desire to be secured by Letters Patent of the United States is:

1. A process for preparing a polyvinyl acetal comprising polymerizing not more than 90% by weight of a selected quantity of a vinyl ester, the polymerization being carried out in a solvent for the polyvinyl ester, and forming a polyvinyl acetal by incorporating in the resulting solution of vinyl ester and polyvinyl ester, a deesterification catalyst and a substance selected from the group consisting of liquid monohydric alcohols and water.

2. A process for preparing a polyvinyl acetal comprising polymerizing not more than 90% by weight of a selected quantity of vinyl acetate, the polymerization being carried out in a solvent for the polyvinyl acetate, and forming a polyvinyl acetal by incorporating in the resulting solution of vinyl acetate and polyvinyl acetate, a deesterification catalyst and a substance selected from the group consisting of liquid monohydric alcohols and water.

3. A process for preparing a polyvinyl acetal comprising polymerizing not more than 90% by weight of a selected quantity of vinyl acetate, the polymerization being carried out in a solvent for the polyvinyl acetate, and forming a polyvinyl acetal by incorporating in the resulting solution of vinyl acetate and polyvinyl acetate, a deesterification catalyst, vinyl acetate and a substance selected from the group consisting of liquid monohydric alcohols and water.

4. A process for preparing a polyvinyl acetal comprising polymerizing not more than 90% by weight of a selected quantity of vinyl acetate, the polymerization being carried out in a solvent for the polyvinyl acetate, and forming a polyvinyl acetal resin by incorporating in the resulting solution of vinyl acetate and polyvinyl acetate, a deesterification catalyst, an aldehyde and a substance selected from the group consisting of liquid monohydric alcohols and water.

5. A process for preparing a polyvinyl acetal comprising polymerizing not more than 90% by weight of a selected quantity of vinyl acetate, the polymerization being carried out in a solvent for the polyvinyl acetate, and forming a polyvinyl acetal by incorporating in the resulting solution of vinyl acetate and polyvinyl acetate, a mineral acid, vinyl acetate and a substance selected from the group consisting of liquid monohydric alcohols and water.

JAMES G. McNALLY.
CHARLES R. FORDYCE.
RALPH H. TALBOT.